United States Patent [19]
Anderson et al.

[11] 3,723,620
[45] Mar. 27, 1973

[54] 3-SUBSTITUTED AMINO-6-HYDRAZINO PYRIDAZINES AS HYPOTENSIVES

[75] Inventors: Paul L. Anderson, Dover; William J. Houlihan; Robert E. Manning, both of Mountain Lakes, all of N.J.

[73] Assignee: Sandoz Wander, Inc., Hanover, N.J.

[22] Filed: Feb. 22, 1971

[21] Appl. No.: 117,752

Related U.S. Application Data

[63] Continuation-in-part of Ser. No. 792,764, Jan. 21, 1969, Pat. No. 3,598,822.

[52] U.S. Cl.................................................424/250
[51] Int. Cl................................................A61k 27/00

[58] Field of Search........................................424/250

[56] References Cited

OTHER PUBLICATIONS

Chem. Abst., Vol. 60, 15,871–15,872, (1964).

*Primary Examiner*—Stanley J. Friedman
*Attorney*—Gerald D. Sharkin, Frederick H. Weinfeldt, Robert S. Honor, Walter F. Jewell, Richard E. Vila, Thomas O. McGovern and Thomas C. Doyle

[57] ABSTRACT

Certain 3-alkenyl substituted amino-6-hydrazino pyridazines have been found to be useful as hypotensive/anti-hypertensive agents and as anorexics.

15 Claims, No Drawings

3-SUBSTITUTED AMINO-6-HYDRAZINO PYRIDAZINES AS HYPOTENSIVES

This application is a continuation-in-part of copending U.S. application Serial No. 792,764, filed January 21, 1969 which issued as U.S. Pat. No. 3,598,822 on Aug. 10, 1971.

This invention relates to pyridazine derivatives. More particularly, this invention concerns the use of 3-substituted amino-6-hydrazino pyridazine and acid addition salts thereof as anti-hypertensive agents and as anorexics. The invention also relates to pharmaceutical compositions containing the above compounds as an active ingredient thereof.

The active agents with which this invention is concerned may be represented by the following structural formula:

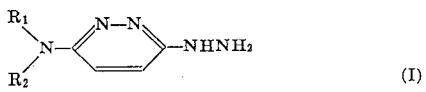

(I)

where $R_1$ and $R_2$ each represent hydrogen or alkenyl having three to five carbon atoms, e.g., allyl, 1-butenyl, or the like, provided at least one of $R_1$ and $R_2$ represents alkenyl or a pharmaceutically acceptable acid addition salt thereof.

The compounds of formula I above are known and may be prepared according to methods disclosed in the literature from known materials. The present invention only contemplates the novel use of such compounds, particularly as hypotensive agents.

As previously indicated, the compounds of formula I are useful because they possess pharmacological activity in animals, particularly as hypotensives/antihypertensives as indicated by their activity in renal hypertensive rat given 30 mg/kg of active compound using the techniques of A. Grollman (Proc. Soc. Exptl. Biol. and Med. 57:102, 1944) and indirectly measuring the blood pressure from the caudal artery in the tail using a pneumatic pulse transducer.

The compounds of formula I are also useful as anorexics as indicated by their activity in rat given 12.5–25 mg/kg orally of active agent and tested by use of the free feeding method described by Randall et al. (J.P.E.T., 129, 163, 1960) whereby 16 groups of 6 male Wistar rats are deprived of food for 18 hours but receive water ad libitum. Consumption of ground food is then measured over a 4 hour period following oral administration of the agent tested.

For such usages, the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like; e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and distintegrating agents, e.g., starch and alginic acid, binding agents, e.g. starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90 percent of the active ingredient in combination with the carrier or adjuvant. Furthermore, these compounds of formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate maleate, malate, tartrate, methanesulfonate, cyclohexylsulfamate and the like.

The anti-hypertensive effective dose of active ingredient employed in the treatment of hypertension may vary depending on the particular compound employed and the severity of the condition being treated. However, in general, satisfactory results are obtained when the compounds I are administered at a daily dosage of from about 1.0 milligram to about 100 milligrams/kilogram of animal body weight, preferably given in divided doses 2 to 4 times a day, or in sustained release form. For most large mammals in need of said treatment the total daily dosage is from about 50 to 400 milligrams. Dosage forms suitable for internal use comprise from about 12.5 to about 200 milligrams of the active compound in intimate admixture with a solid or liquid pharmaceutically acceptable carrier or diluent.

The anorexic effective dose of active ingredient employed for the treatment of anorexia will also vary depending on the particular compound employed and the severity of the condition being treated. In general, satisfactory results are obtained when the compounds of formula I are administered as an anorexigenic at a daily dosage of about 1–25 mg/kg of animal body weight. This daily dosage is preferably administered 2 to 4 times a day, or in sustained release form. For most large mammals such as primates in need of said treatment the total daily dosage is about 50–250 milligrams. Dosage forms suitable for internal use comprise from about 12.5 mg. to 125 mg., respectively, of the active compound in intimate admixture with a solid or liquid pharmaceuticallt acceptable carrier or diluent.

The preferred pharmaceutical compositions from the standpoint of preparation and ease of administration are solid compositions, particularly hard-filled capsules and tablets.

The following examples are provided for the purpose of illustration and not by way of limitation. They are not intended so as to limit the scope of the invention as defined in the appended claims.

EXAMPLE 1

Tablets

Tablets suitable for oral administration which contain the following ingredients may be prepared by conventional tabletting techniques. Such tablets are useful in treating hypertension or anorexia at a dose of one tablet 2 to 4 times a day.

| Ingredient | Weight (mg) |
|---|---|
| 3-diallylamino-6-hydrazino pyridazine dihydrochloride | 25 |
| tragacanth | 10 |
| lactose | 223.5 |
| corn starch | 25 |
| talcum | 15 |
| magnesium stearate | 2.5 |

EXAMPLE 2

Dry Filled Capsules

Capsules suitable for oral administration which contain the following ingredients are prepared in a conventional manner. Such capsules are useful in treating hypertension or anorexia at a dose of one capsule 2–4 times a day.

| Ingredient | Weight (mg) |
|---|---|
| 3-diallylamino-6-hydrazino pyridazine dihydrochloride | 25 |
| Inert solid diluent (starch, lactose, kaolin) | 275 |

EXAMPLE 3

Sterile Solution for Injection

The following ingredients are dissolved in water for injection. The resulting solution is filtered through an appropriate medium to render a clear solution. The solution is then autoclaved to render it sterile for use in the treatment of hypertension or anorexia.

| Ingredient | Weight (%) |
|---|---|
| 3-diallylamino-6-hydrazino pyridazine dihydrochloride | 10 |
| sodium alginate | 0.5 |
| buffer system | As desired |
| lecithin | 0.5 |
| sodium chloride | As desired |
| water for injection | To desired volume |

EXAMPLE 4

The following formulations for syrups or elixirs useful in the treatment of hypertension or anorexia containing an effective amount of active compound may be formulated using conventional methods.

| | Percent by Weight syrup | elixir |
|---|---|---|
| 3-diallylamino-6-hydrazino-pyridazine dihydrochloride | 0.5–3.5 | 0.5–3.5 |
| buffering system | quantity sufficient to adjust pH | |
| sodium benzoate | 0.1–0.5 | 0.1–0.5 |
| flavoring agent | .01–0.2 | 0.01–0.2 |
| water | 20–40 | 5–20 |
| simple syrup U.S.P. | 30–70 | 0 |
| sorbitol solution (70%) | 10–30 | 20–60 |
| certified dye | 0.5–2 | 0.5–2 |
| alcohol | 0 | 2.5–20 |
| methyl paraben | 0 | 0.05–0.1 |
| propyl paraben | 0 | 0.05–0.1 |
| sodium cyclamate | 0 | 0.1–0.4 |
| sodium saccharin | 0 | 0.01–0.04 |

What is claimed is:

1. A pharmaceutical composition useful in the treatment of hypertension or anorexia comprising as an active ingredient thereof a compound of the formula

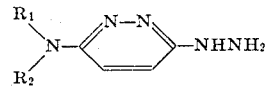

where $R_1$ and $R_2$ each represent hydrogen or alkenyl having three to five carbon atoms, provided at least one of $R_1$ or $R_2$ represents alkenyl, or a pharmaceutically acceptable acid addition salt thereof, and a pharmaceutically acceptable carrier therefor, said compound being present in said composition in an amount sufficient to provide a daily dosage of from about 50 milligrams to about 400 milligrams of said compound.

2. A pharmaceutical composition according to claim 1 wherein the active ingredient is present in said composition in an amount sufficient to provide a daily dosage of from about 50 milligrams to about 250 milligrams of said compound.

3. A pharmaceutical composition according to claim 1 useful in the treatment of hypertension wherein the active ingredient is present in said composition to the extent of from about 12.5 milligrams to about 200 milligrams per unit dosage.

4. A pharmaceutical composition according to claim 1 useful in the treatment of anorexia wherein the active ingredient is present in said composition to the extent of from about 12.5 milligrams to about 125 milligrams per unit dosage.

5. A composition according to claim 1 wherein the carrier is a solid orally ingestible carrier.

6. A tablet useful for treating hypertension or anorexia comprising as an active ingredient thereof a compound of the formula

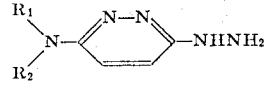

where $R_1$ and $R_2$ and the proviso are as set out in claim 1, or a non-toxic pharmaceutically acceptable acid addition salt thereof and a pharmaceutically acceptable carrier.

7. A method for treating hypertension, which comprises orally or parenterally administering to an animal in need of said treatment an antihypertensive effective amount of a compound of the formula

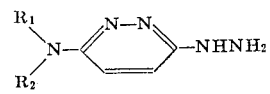

where $R_1$ and $R_2$ and the proviso are as set out in claim 1, or a non-toxic pharmaceutically acceptable acid addition salt thereof.

8. A method according to claim 7 wherein the compound is administered at a daily dose of from about 50 milligrams to about 400 milligrams.

9. A method according to claim 7 wherein the compound is administered in a unit dosage form comprising said compound to the extent of from about 12.5 milligrams to about 200 milligrams per unit dosage.

10. A method for treating anorexia in an animal in need of said treatment which comprises orally or parenterally administering to said animal an anorexic effective amount of a compound of the formula:

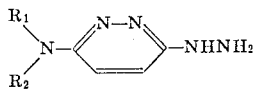

where $R_1$ and $R_2$ and the proviso are as set out in claim 1, or a non-toxic pharmaceutically acceptable acid addition salt thereof.

11. A method according to claim 10 wherein the compound is administered at a daily dose of from about 50 milligrams to about 250 milligrams.

12. A method according to claim 10 wherein the compound is administered in a unit dosage form comprising said compound to the extent of from about 12.5 milligrams to about 125 milligrams per unit dosage.

13. The composition of claim 1 in which the active ingredient is 3-diallylamino-6-hydrazinopyridazine dihydrochloride.

14. The method of claim 7 in which the compounds is 3-diallylamino-6-hydrazinopyridazine dihydrochloride.

15. The method of claim 10 in which the compound is 3-diallylamino-6-hydrazinopyridazine dihydrochloride.

* * * * *